United States Patent
Konchan

(10) Patent No.: US 11,078,693 B2
(45) Date of Patent: Aug. 3, 2021

(54) COVER FOR SIDE DOOR RELEASE HANDLE

(71) Applicant: GM Global Technology Operations LLC, Detroit, MI (US)

(72) Inventor: Jeffrey L. Konchan, Romeo, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 202 days.

(21) Appl. No.: 16/172,070

(22) Filed: Oct. 26, 2018

(65) Prior Publication Data

US 2020/0131811 A1    Apr. 30, 2020

(51) Int. Cl.
    E06B 3/00     (2006.01)
    E05B 81/90    (2014.01)
    E05B 77/06    (2014.01)
    B60R 13/02    (2006.01)
    E05B 85/14    (2014.01)

(52) U.S. Cl.
    CPC .......... *E05B 81/90* (2013.01); *B60R 13/0275* (2013.01); *E05B 77/06* (2013.01); *E05B 85/14* (2013.01); *E05Y 2900/53* (2013.01)

(58) Field of Classification Search
    CPC .......... E05B 81/90; E05B 81/76; E05B 77/06; E05B 77/04; E05B 85/14; E05B 13/002; B60R 13/0243

USPC .......................................... 49/503
    See application file for complete search history.

(56) References Cited

U.S. PATENT DOCUMENTS

| | | | | |
|---|---|---|---|---|
| 5,039,145 A * | 8/1991 | Frye | ...... | E05B 77/34 292/336.3 |
| 6,530,251 B1 * | 3/2003 | Dimig | ...... | E05B 79/06 292/336.3 |
| 8,322,077 B2 * | 12/2012 | Papanikolaou | ...... | E05B 85/18 49/460 |
| 8,701,353 B2 * | 4/2014 | Patel | ...... | E05B 85/103 49/503 |
| 9,382,734 B2 * | 7/2016 | Rosales | ...... | E05B 85/16 |
| 9,810,006 B2 * | 11/2017 | Papanikolaou | ...... | E05B 85/16 |
| 10,024,086 B2 * | 7/2018 | Lesueur | ...... | E05B 85/14 |
| 10,815,705 B2 * | 10/2020 | Puscas | ...... | E05B 79/20 |
| 2015/0345188 A1 * | 12/2015 | Puscas | ...... | E05B 85/16 292/336.3 |

* cited by examiner

Primary Examiner — Jerry E Redman

(57) ABSTRACT

An apparatus for preventing inadvertent actuation of a door release handle of a motor vehicle includes a cover with a lip that engages with an edge of an opening in an inner body panel, and at least one rib attached to the cover, the at least one rib being positioned relative to the door release handle to prevent actuation of the handle when the cover is positioned in the opening of the inner body panel.

13 Claims, 3 Drawing Sheets

COVER FOR SIDE DOOR RELEASE HANDLE

INTRODUCTION

The present disclosure relates to a door release handle during an emergency event. More specifically, the present disclosure relates to the prevention of inadvertent opening of a door with a release handle during an emergency event.

In certain vehicles such as, for example, in certain autonomous vehicles, the doors that provide access to the vehicle are electrically operated, such that the opening and closing of the doors is automated. In an emergency situation or if there is a power failure, the electrical activation of the doors may not be possible. Accordingly, these vehicles may be provided with a manual emergency door release handle. During an emergency event, however, deformation of the vehicle or the handles inertia may result in inadvertent release and opening of the door.

Thus, while current door release mechanisms achieve their intended purpose, there is a need for a new and improved system and method for opening a door while preventing the inadvertent opening of the door.

SUMMARY

According to several aspects, an apparatus for preventing inadvertent actuation of a door release handle of a motor vehicle includes a cover with a lip that engages with an edge of an opening in an inner body panel, and at least one rib attached to the cover, the at least one rib being positioned relative to the door release handle to prevent actuation of the handle when the cover is positioned in the opening of the inner body panel.

In an additional aspect of the present disclosure, the cover pivots about the edge of the opening in the inner body panel to provide access to the door release handle.

In another aspect of the present disclosure, the cover has a slot for placement of fingers to pull the cover away from the inner door panel.

In another aspect of the present disclosure, the door release handle is attached to an outer body panel, the door release handle being movable in a pivotal manner relative to the outer body panel to release one or more latches to open the door when the cover and the one or more ribs pulled away from the inner body panel.

In another aspect of the present disclosure, the apparatus further includes a tether that is attached to the inner body panel and the cover.

In another aspect of the present disclosure, the apparatus further includes a micro-switch that detects when the cover is removed from the inner body panel.

In another aspect of the present disclosure, when the micro-switch detects that the cover is removed, an internal audible warning is issued to indicate that the door release handle is accessible.

In another aspect of the present disclosure, when the micro-switch detects that the cover is removed, a back office is notified that the door release handle is accessible.

In another aspect of the present disclosure, the back office notifies emergency responders.

In another aspect of the present disclosure, the back office issues instructions to the motor vehicle to safely stop and park.

According to several aspects, an apparatus for preventing inadvertent actuation of a door release handle of a motor vehicle includes a cover with a lip that engages with an edge of an opening in an inner body panel, at least one rib attached to the cover, the at least one rib being positioned relative to the door release handle to prevent actuation of the handle when the cover is positioned in the opening of the inner body panel, and a micro-switch that detects when the cover is removed from the inner body panel, an internal audible warning being issued to indicate that the door release handle is accessible when the cover is removed from the inner door panel.

In another aspect of the present disclosure, when the micro-switch detects that the cover is removed, a back office is notified that the door release handle is accessible.

In another aspect of the present disclosure, the back office notifies emergency responders.

In another aspect of the present disclosure, the back office issues instructions to the motor vehicle to safely stop and park.

In another aspect of the present disclosure, the cover has a slot for placement of fingers to pull the cover away from the inner door panel.

According to several aspects, a method of providing access to a door release handle of a motor vehicle during an emergency includes one or more of the following: removing a cover from an opening in an inner body panel, at least one rib being attached to the cover, the at least one rib being positioned relative to the door release handle to prevent actuation of the handle when the cover is positioned in the opening of the inner body panel; issuing an internal audible warning that the door release handle is accessible when the cover is removed; activating an internal light to illuminate the handle; and notifying a back office that the cover is removed.

In another aspect of the present disclosure, the method further includes determining if the motor vehicle is stopped.

In another aspect of the present disclosure, the back office issue instructions to the motor vehicle to safely stop and park if the motor vehicle is not stopped.

In another aspect of the present disclosure, the method further includes issuing an audible warning to not open the door if the motor vehicle is not stopped.

In another aspect of the present disclosure, the back office notifies emergency responders.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1A:
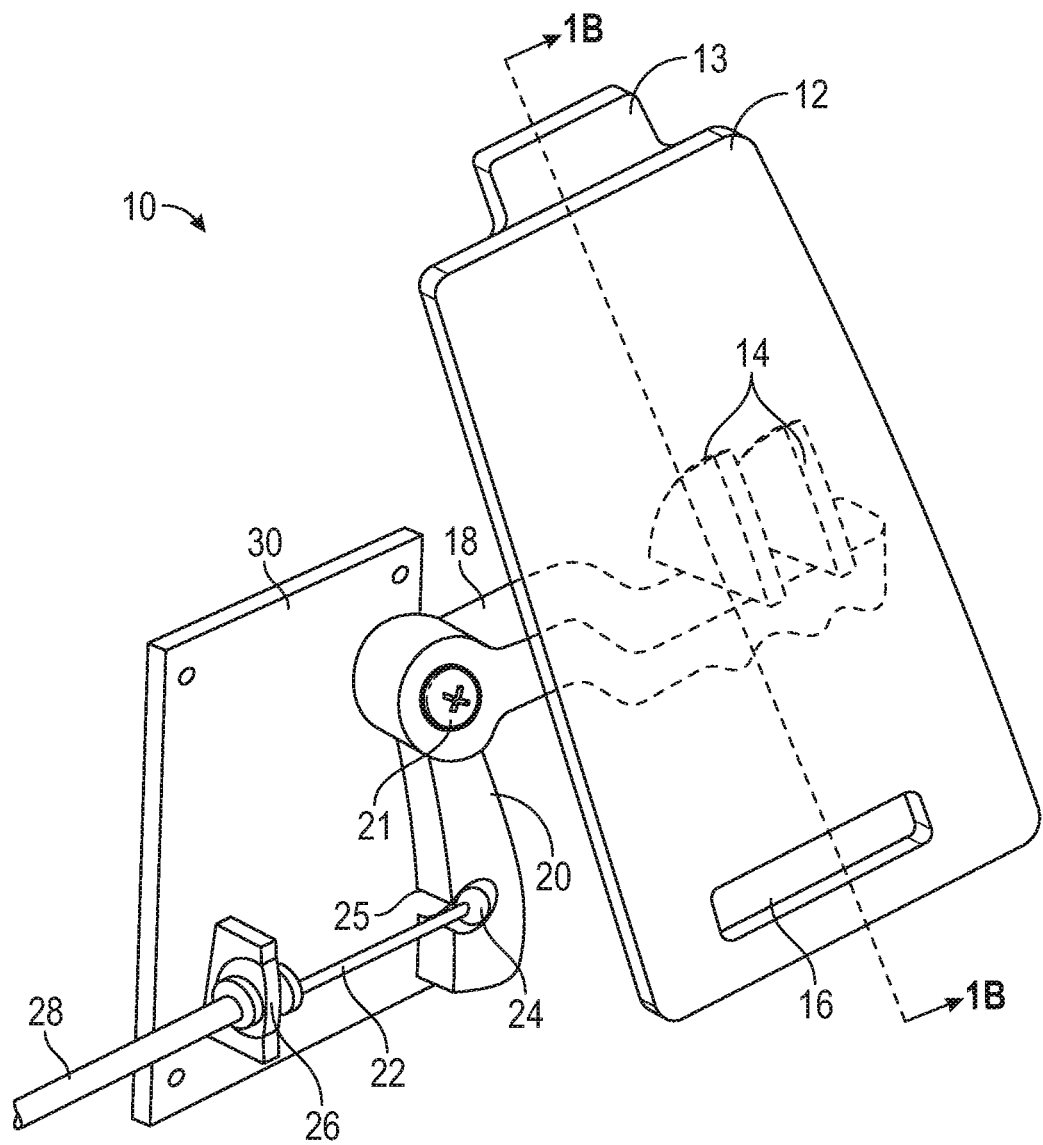
FIG. 1A is a perspective view of a cover for a door release handle according to an exemplary embodiment.
Figure 1B:
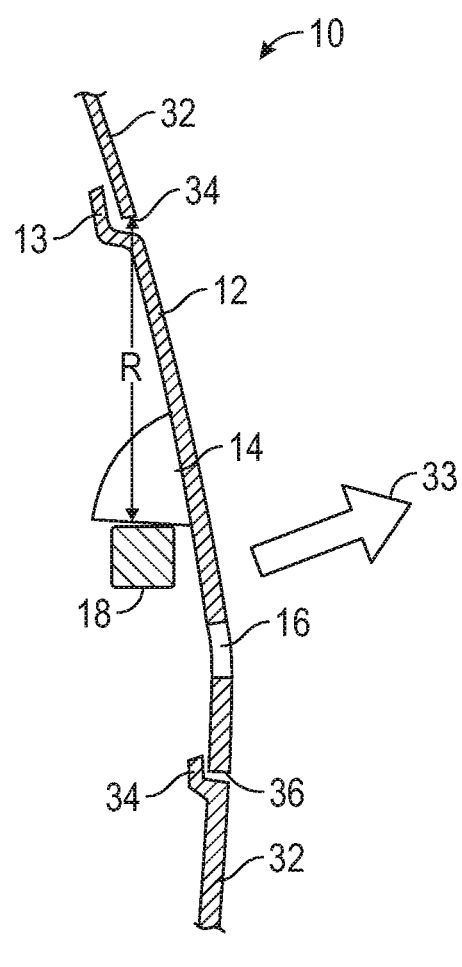
FIG. 1B is a cross-sectional view of the cover along the line 1B-1B in FIG. 1A according to an exemplary embodiment.

Referring to FIGS. 1A and 1B, there is shown an apparatus 10 that prevents the inadvertent actuation of a door release handle of a motor vehicle. In particular, a cover 12 blocks a handle 18 to prevent the inadvertent actuation by inertia or mechanical deformation of the motor vehicle body during an emergency event. During an emergency event, the occupant removes the cover 12 to provide access to the handle 18. Prior to the actuation of the handle 18, the apparatus 10 notices a back office of the emergency situation. The back office notifies emergency responders and initiates a slowing/stopping process of the motor vehicle to a safe location.

The handle 18 is attached to an outer body panel 30. The handle 18 rotates about an attachment point 21. A portion 20 of the handle 18 extends downward and includes a slot 25. A cable 22 includes an enlarged portion 24 that fits within the slot 25. The enlarged portion 24 and the slot 25 are configured and sized such that the enlarged portion 24 does not pull out of the slot 25 when tension is applied to the cable 22. An end of a sleeve 28 is secured to the outer body panel 30 with a support feature 26 that is attached to the outer body panel 30. The cable 22 extends through the sleeve 28 at is attached to one or more latches, which when released enables the motor vehicle door to be opened. The outer body panel 30 is the door itself in certain arrangements, while in other arrangements the outer body panel 30 is adjacent to the door. Accordingly, for example, in an emergency situation, an occupant grips the handle 18 and rotates it counterclockwise, which applies a tension to the cable 22. In turn, tension on the cable 22 releases the one or more door latches to open the door.

The cover 12 includes a lip portion 13 that fits behind an inner body panel 32 and a bottom edge 36 of the cover of the cover 12 sits against a lip portion 34 of the inner body panel when the cover 12 is positioned on the inner body panel 32, as shown in FIG. 1B. One or more ribs 14 extend outwardly from the cover 12 and are positioned over the handle 18. As such, when the cover 12 is positioned on the inner body panel 32, the handle 18 cannot rotate to release the door latches because of inertia of the handle 18 or deformation of the motor vehicle during, for example, an emergency event. The cover 12 is made of plastic in some arrangements or made of metal in other arrangements. The cover 12 is translucent or transparent in particular arrangements, while in other arrangements, the cover 12 is opaque. In certain arrangements, the handle 18 is colored red to indicate that the handle should be utilized only in emergency situations.

Figure 2:
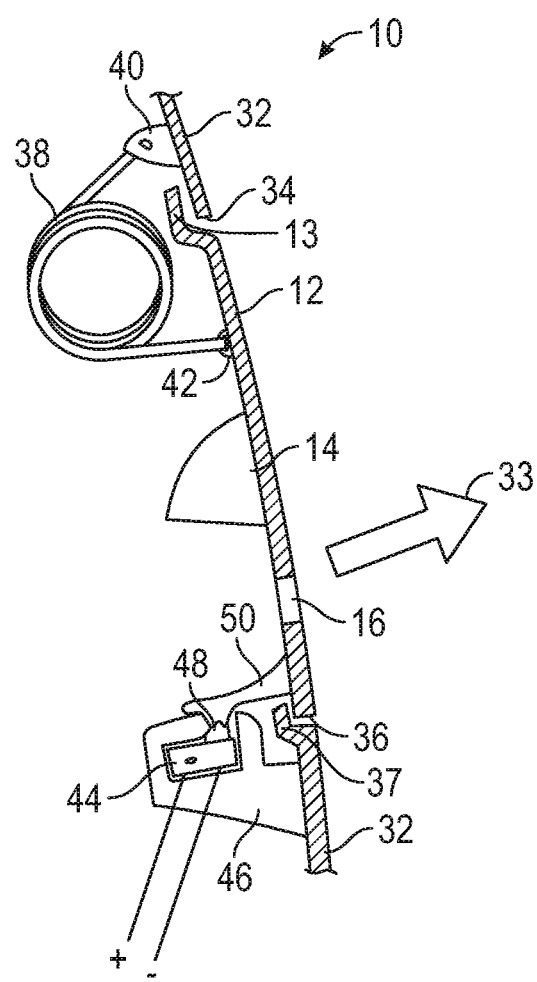
FIG. 2 is cross-section view of the cover along with a tether and a micro-switch according to an exemplary embodiment.

To gain access to the handle 18, the occupant places one or more fingers into a slot 16 and pulls on the cover 12 in the direction 33, which causes the cover 12 to rotate about an edge 34 with a radius, R. When the lip portion 13 is clear of the edge 34, the cover 12 can be completely removed from the inner body panel 32. In some arrangements, as shown in FIG. 2, a tether 38 is attached at one end 40 to the inner body panel 32 and at the other end 42 to the cover 12, so that the cover is not subsequently misplaced after removal from the inner body panel 32.

In certain arrangements, the cover 12 includes an extension 50 that engages with a portion 48 of a micro-switch 44 attached to the inner body panel 32 with an extension 46 when the cover 12 is positioned on the inner body panel 32. When the cover 12 is removed the extension 50 disengages with the portion 48 of the micro-switch 44. In turn, the micro-switch activates an audible signal to the occupant that the cover 12 to the handle 18 has been removed. In some arrangements, the micro-switch 44 communicates with a back office, indicating an emergency situation or possible tampering of the motor vehicle. In certain arrangements, the back office sends instructions to the motor vehicle if it is moving to slow down and stop in a safe location. In particular arrangements the back office informs emergency responders to the emergency situation.

Figure 3:
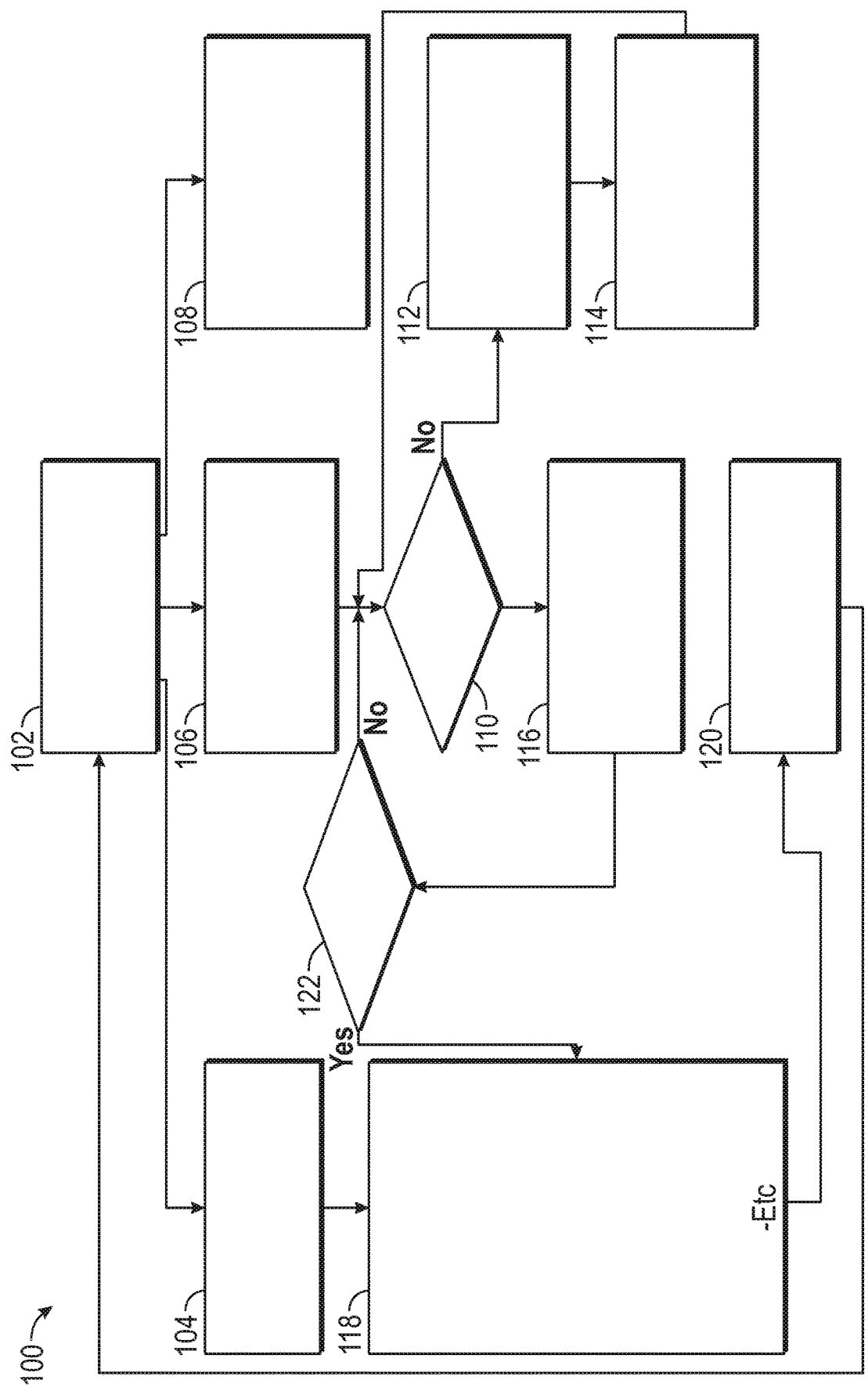
FIG. 3 is a flow diagram of a sequence for providing access to a door release handle of a motor vehicle during an emergency.

Referring now to FIG. 3, there is shown a process 100 utilizing the apparatus 10 to provide access to the handle 18 during an emergency event. In step 102, the emergency door release handle cover 12 is removed or opened. In step 104, the back office is notified of an emergency release handle access attempt. In step 106, an internal vehicle audible warning is issued stating that the door release handle is now accessible. In step 108, internal vehicle lighting is adjusted as appropriate, and an emergency release handle light is activated to illuminate the handle 18.

When the back office is notified in step 104, appropriate actions are taken by the back office step 118. For example, the back office contacts authorities for emergency response if appropriate, captures with a video camera the situation or events inside and outside of the motor vehicle, and assists in the safely stopping and parking of the motor vehicle if necessary. In step 120, an emergency responder replaces or closes the cover 12 onto the inner body panel 32 if appropriate.

When the audible warning is issued in step 106, a decision step 110 determines if the motor vehicle is stopped. If the vehicle is not stopped, the process 100 issues in step 112 an internal audible warning that the vehicle is moving and, therefore, do not open the door. If the motor vehicle is, for example, an autonomous vehicle, the process 100 in step 114 guides the motor vehicle to safely stop and park.

If the decision step 110 determines that the motor vehicle is stopped, the process 100 issues in step 116 an internal audible instruction to pull the handle 18 upward to open the door. The process 100 then proceeds to step 122, which determines if the door is opened. If the door is opened, the process 100 proceeds to step 118 described previously. If the decision step 122 determines that the door is not opened, the process 100 loops back to the decision step 110.

In some arrangements, the process 100 is implemented as an algorithm in a processor such as an electronic control unit located within the motor vehicle. In particular arrangements, the algorithm is a software algorithm stored in a non-transitory computer readable mechanism associated with the electronic control unit.

An apparatus 10 and process 100 of the present disclosure offers several advantages. These include prevention of inadvertent actuation of an emergency door release handle, enabling lower handle release effort (that is, less handle return spring force required to keep the handle from actuating the latches because of handle inertia), improving occupant safety, and preventing tampering of the release handle.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An apparatus for preventing inadvertent actuation of a door release handle of a motor vehicle, the apparatus comprising:
   a cover with a lip that engages with an edge of an opening in an inner body panel;
   at least one rib attached to the cover, the at least one rib being positioned relative to the door release handle to prevent actuation of the handle when the cover is positioned in the opening of the inner body panel; and a micro-switch that detects when the cover has been removed from the inner body panel, a back office being notified to indicate that the door release handle is accessible when the cover has been removed from the inner body panel.

2. The apparatus of claim 1, wherein the cover pivots about the edge of the opening in the inner body panel to provide access to the door release handle.

3. The apparatus of claim 2, wherein the cover has a slot for placement of fingers to pull the cover away from the inner body panel.

4. The apparatus of claim 1, wherein the door release handle is attached to an outer body panel, the door release handle being movable in a pivotal manner relative to the outer body panel to release one or more latches to open the door when the cover and the one or more ribs pulled away from the inner body panel.

5. The apparatus of claim 1 further comprising a tether that is attached to the inner body panel and the cover.

6. The apparatus of claim 1, wherein when the micro-switch detects that the cover has been removed, an internal audible warning is issued to indicate that the door release handle is accessible.

7. The apparatus of claim 1, wherein the back office notifies emergency responders.

8. The apparatus of claim 1, wherein the back office issues instructions to the motor vehicle to safely stop and park.

9. An apparatus for preventing inadvertent actuation of a door release handle of a motor vehicle, the apparatus comprising:

a cover with a lip that engages with an edge of an opening in an inner body panel;

at least one rib attached to the cover, the at least one rib being positioned relative to the door release handle to prevent actuation of the handle when the cover is positioned in the opening of the inner body panel; and a micro-switch that detects when the cover has been removed from the inner body panel, an internal audible warning being issued to indicate that the door release handle is accessible when the cover has been removed from the inner body panel.

10. The apparatus of claim 9, wherein when the micro-switch detects that the cover has been removed, a back office is notified that the door release handle is accessible.

11. The apparatus of claim 10, wherein the back office notifies emergency responders.

12. The apparatus of claim 11, wherein the back office issues instructions to the motor vehicle to safely stop and park.

13. The apparatus of claim 9, wherein the cover has a slot for placement of fingers to pull the cover away from the inner body panel.

\* \* \* \* \*